US011750351B2

(12) United States Patent
Taherzadeh Boroujeni et al.

(10) Patent No.: US 11,750,351 B2
(45) Date of Patent: Sep. 5, 2023

(54) COMMUNICATING ON A SIDELINK CHANNEL USING A MAC-CE

(71) Applicant: QUALCOMM Incorporated, San Diego, CA (US)

(72) Inventors: Mahmoud Taherzadeh Boroujeni, San Diego, CA (US); Sony Akkarakaran, Poway, CA (US); Tao Luo, San Diego, CA (US); Juan Montojo, San Diego, CA (US); Junyi Li, Chester, NJ (US); Jung Ho Ryu, Fort Lee, NJ (US); Hong Cheng, Basking Ridge, NJ (US); Kapil Gulati, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 17/003,496

(22) Filed: Aug. 26, 2020

(65) Prior Publication Data

US 2021/0067303 A1   Mar. 4, 2021

Related U.S. Application Data

(60) Provisional application No. 62/894,382, filed on Aug. 30, 2019.

(51) Int. Cl.
*H04L 5/00* (2006.01)
*H04W 92/18* (2009.01)

(52) U.S. Cl.
CPC .......... *H04L 5/0055* (2013.01); *H04W 92/18* (2013.01)

(58) Field of Classification Search
CPC . H04L 5/0055; H04L 27/2602; H04L 5/0057; H04L 5/0094; H04L 1/1893; H04L 1/0026; H04W 92/18; H04W 4/40; H04W 76/14
USPC ......................................................... 370/329
See application file for complete search history.

(56) References Cited

U.S. PATENT DOCUMENTS

| | | | |
|---|---|---|---|
| 2017/0207843 A1* | 7/2017 | Jung | H04B 7/063 |
| 2018/0167883 A1* | 6/2018 | Guo | H04W 72/02 |
| 2019/0037426 A1* | 1/2019 | Yu | H04W 24/10 |
| 2020/0304272 A1* | 9/2020 | Lee | H04W 4/025 |
| 2020/0314804 A1* | 10/2020 | Shin | H04W 24/10 |
| 2020/0389270 A1* | 12/2020 | Lee | H04L 5/0048 |
| 2021/0092737 A1* | 3/2021 | Tang | H04W 4/40 |

OTHER PUBLICATIONS

*Citation part 1 of 2*—Ericsson: "PHY Layer Procedures for Sidelink", 3GPP Draft, 3GPP TSG-RAN WG1 Meeting #97, R1-1907143 Ericsson—Physical Layer Procedures for Sidelink, 3rd Generation Partnership Project (3GPP), Mobile Competence Centre, 650, Route Des Lucioles, F-06921 Sophia-Antipolis Cedex, vol. RAN WG1, No. Reno, US, May 13, 2019.

(Continued)

*Primary Examiner* — Mang Hang Yeung
(74) *Attorney, Agent, or Firm* — Harrity & Harrity, LLP (57) ABSTRACT

Various aspects of the present disclosure generally relate to wireless communication. In some aspects, a user equipment (UE) may determine a medium access control (MAC) control element (CE) configuration for a sidelink channel; and communicate on the sidelink channel using a MAC-CE configured according to the MAC-CE configuration. Numerous other aspects are provided.

28 Claims, 8 Drawing Sheets

(56) References Cited

OTHER PUBLICATIONS

*Citation part 2 of 2*—May 17, 2019, May 13, 2019 (May 13, 2019), XP051728589, 13 pages Retrieved from the Internet URL: http://www.3gpp.org/ftp/Meetings%5F3GPP%5FSYNC/RAN1/Docs/R1%2D1907143%2Ezip, [retrieved on May 13, 2019], p. 7, line 1, paragraph 3.3—line 6 p. 8; figure 2.
International Search Report and Written Opinion—PCT/US2020/048117—ISA/EPO—dated Feb. 2, 2021.
*Citation part 1 of 2*—LG Electronics: "Discussion on Physical Layer Procedures for NR Sidelink," 3GPP Draft, 3GPP TSG RAN WG1 Meeting #98, R1-1908906, Discussion on Physical Layer Procedures for NR Sidelink, 3rd Generation Partnership Project (3GPP), Mobile Competence Centre, 650, Route Des Lucioles, F-06921, Sophia-Antipolis Cedex, France, vol.
*Citation part 2 of 2*—RAN WG1, No. Prague, CZ, Aug. 26, 2019-Aug. 30, 2019, Aug. 17, 2019 (Aug. 17, 2019), XP051765514, 19 pages, Retrieved from the Internet: URL: http://www.3gpp.org/ftp/tsg_ran/WG1_RL1/TSGR1_98/Docs/R1-1908906.zip [retrieved on Aug. 17, 2019] section 2.2.2 section 2.1; p. 3-p. 4 section 2.2.1; p. 6-p. 7.
*Citation part 1 of 2*—Qualcomm Incorporated: "Physical Layer Procedures for Sidelink", 3GPP Draft, 3GPP TSG RAN WG1 #98, R1-1909257 Physical Layer Procedures for Sidelink, 3rd Generation Partnership Project (3GPP), Mobile Competence Centre, 650, Route Des Lucioles, F-06921, Sophia-Antipolis Cedex, France, vol. RAN WG1, No. Prague, CZ.
*Citation part 2 of 2*—Aug. 26, 2019-Aug. 30, 2019, Aug. 16, 2019 (Aug. 16, 2019), XP051765862, 17 Pages, Retrieved from he Internet: URL: http://www.3gpp.org/ftp/tsg_ran/WG1_RL1/TSGR1_98/Docs/R1-1909257.zip, [retrieved on Aug. 16, 2019], Sections 1-5, in particular 2.1.2 and 2.1.3, figures 6-7.

* cited by examiner

COMMUNICATING ON A SIDELINK CHANNEL USING A MAC-CE

CROSS-REFERENCE TO RELATED APPLICATION

This patent application claims priority to U.S. Provisional Patent Application No. 62/894,382, filed on Aug. 30, 2019, entitled "COMMUNICATING ON A SIDELINK CHANNEL USING A MAC-CE," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for communicating on a sidelink channel using a medium access control (MAC) control element (CE) (MAC-CE).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining a medium access control (MAC) control element (CE) (MAC-CE) configuration for a sidelink channel; and communicating on the sidelink channel using a MAC-CE configured according to the MAC-CE configuration.

In some aspects, a UE for wireless communication may include memory and one or more processors operatively coupled to the memory. The memory and the one or more processors may be configured to determine a MAC-CE configuration for a sidelink channel; and communicate on the sidelink channel using a MAC-CE configured according to the MAC-CE configuration.

In some aspects, a non-transitory computer-readable medium may store one or more instructions for wireless communication. The one or more instructions, when executed by one or more processors of a UE, may cause the one or more processors to: determine a MAC-CE configuration for a sidelink channel; and communicate on the sidelink channel using a MAC-CE configured according to the MAC-CE configuration.

In some aspects, an apparatus for wireless communication may include means for determining a MAC-CE configuration for a sidelink channel; and means for communicating on the sidelink channel using a MAC-CE configured according to the MAC-CE configuration.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
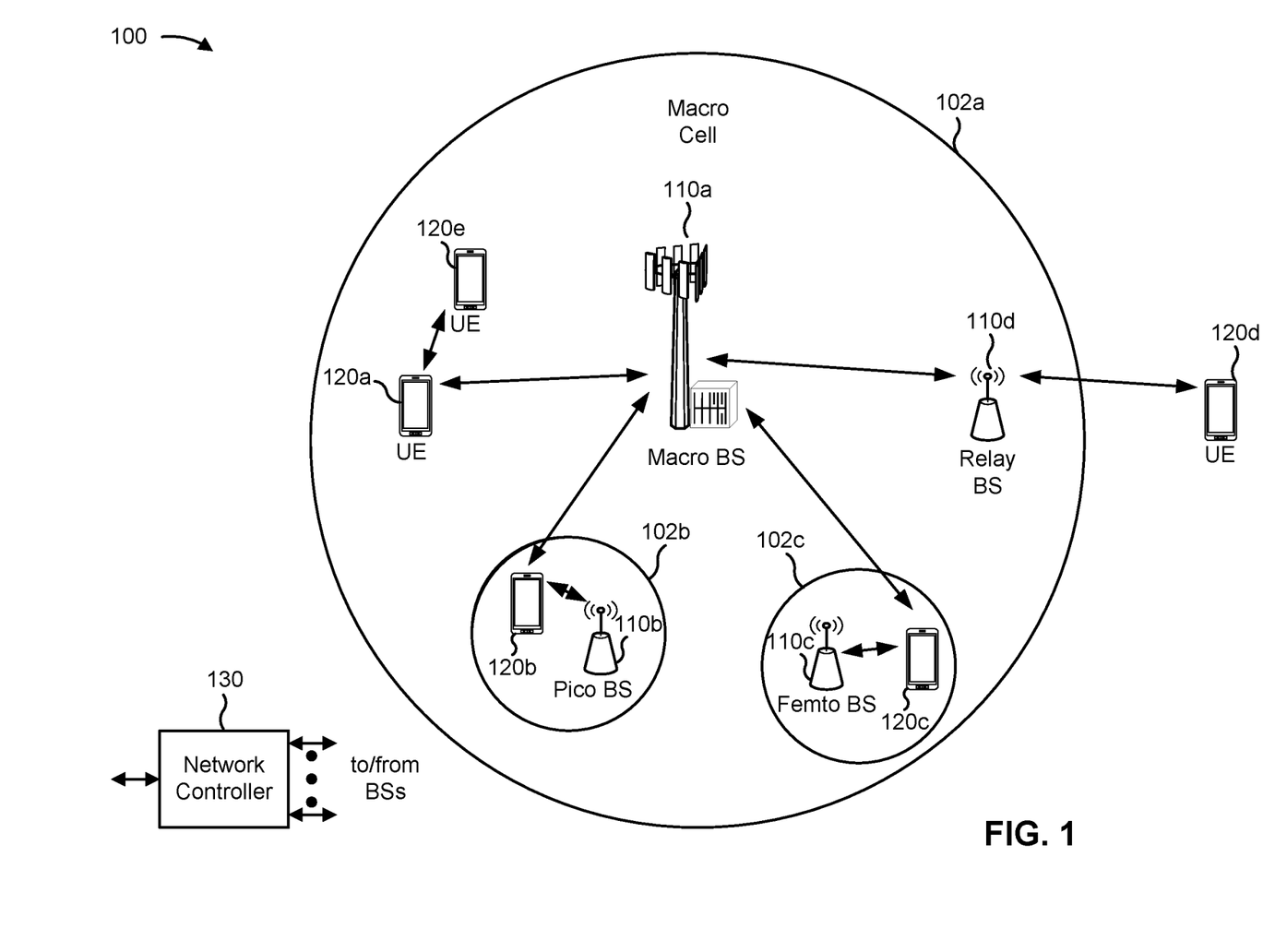
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts)

whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
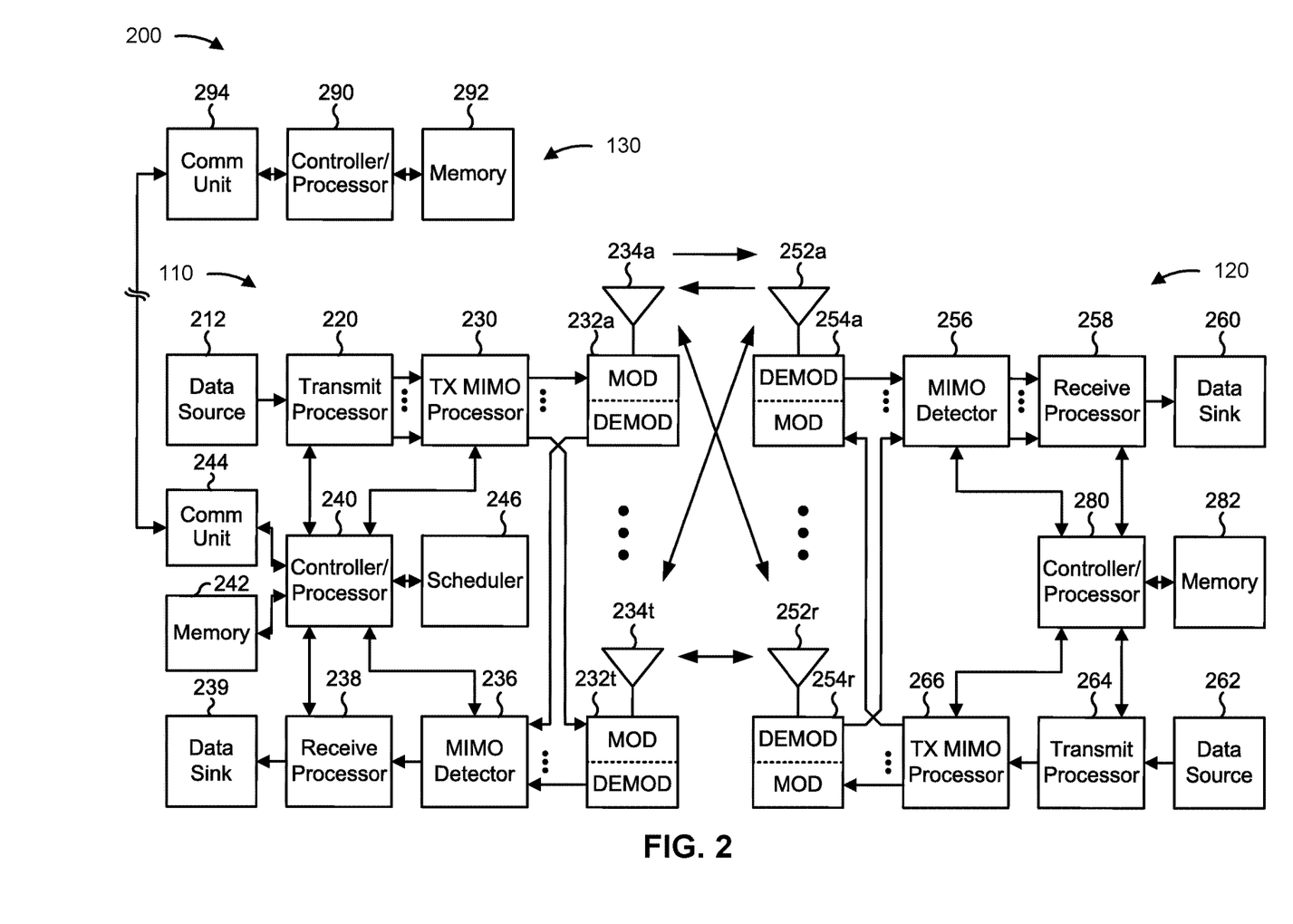
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with communicating on a sidelink channel using a MAC-CE, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8 and/or other processes as described herein. A scheduler 246 may schedule UEs for data transmission on the downlink and/or uplink.

In some aspects, UE 120 may include means for determining a MAC-CE configuration for a sidelink channel; means for communicating on the sidelink channel using a MAC-CE configured according to the MAC-CE configuration; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
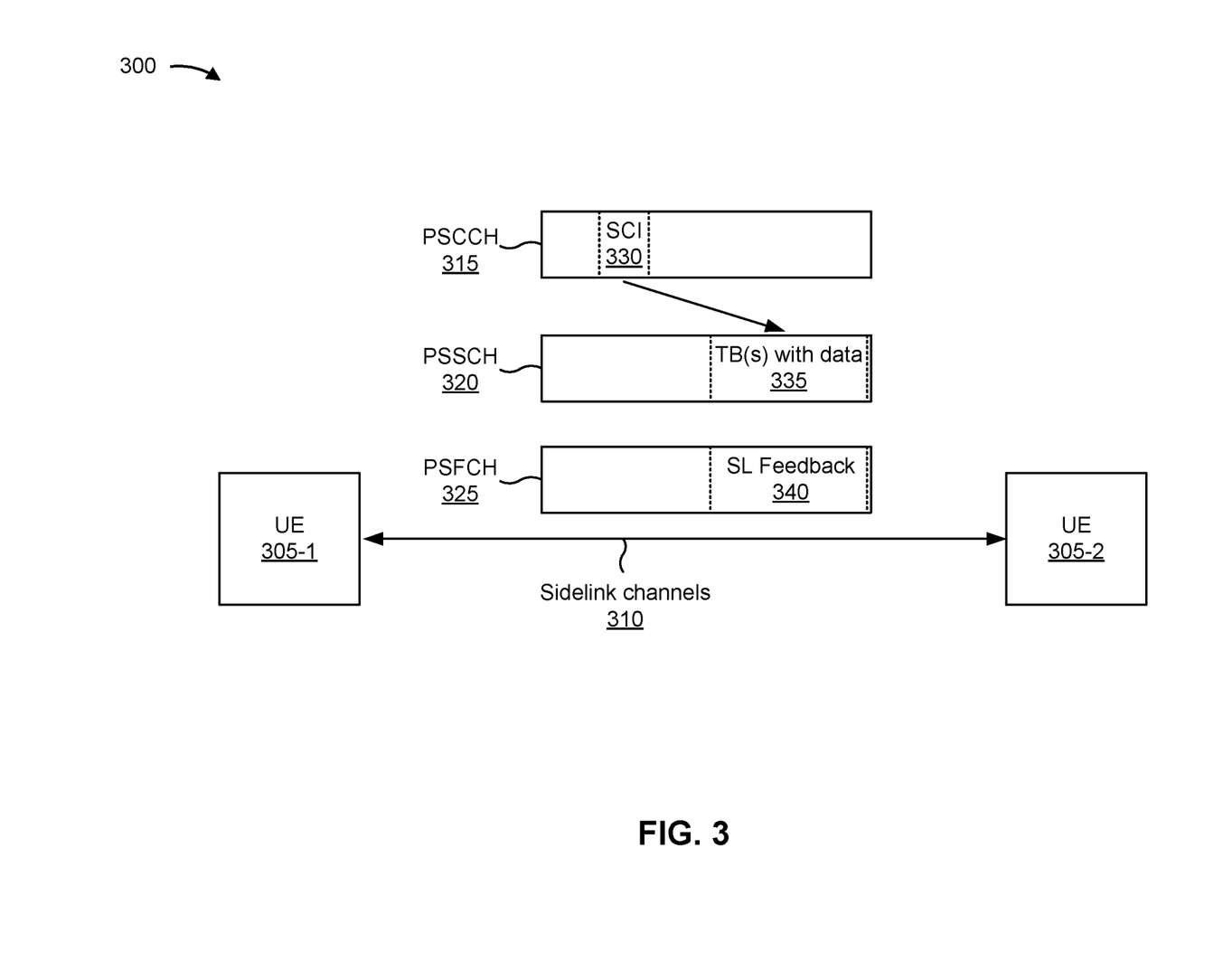
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or the like), a mesh network, and/or the like. In some aspects, the UEs 305 may correspond to one or more other UEs described elsewhere herein, such as UE 120 and/or the like. In some aspects, the sidelink channel 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the sidelink channel 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for communications with a base station 110 via an access link or an access channel. The PSSCH 320 may be used to communicate data, similar to a physical downlink shared channel (PDSCH) and/or a physical uplink shared channel (PUSCH) used for communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 that includes data is carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the sidelink channel 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
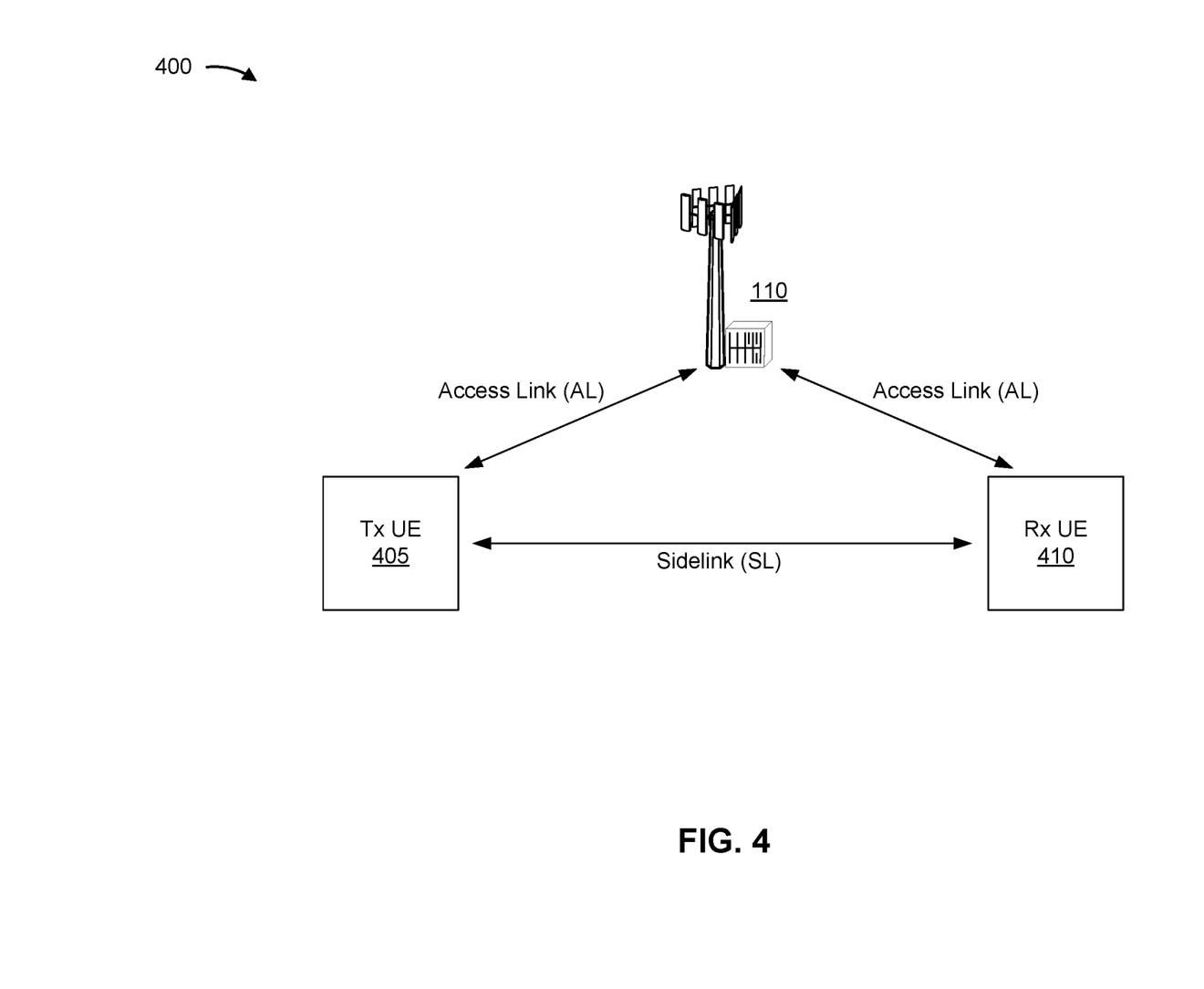
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx) UE 405 and a receiver (Rx) UE 410 may communicate with one another via a sidelink, as described above in connection with FIG. 3. As further shown, in some sidelink modes, a base station 110 may communicate with the Tx UE 405 via a first access link. Additionally, or alternatively, in some sidelink modes, the base station 110 may communicate with the Rx UE 410 via a second access link. The Tx UE 405 and/or the Rx UE 410 may correspond to one or more UEs described elsewhere herein, such as the UE 120 of FIG. 1. Thus, a sidelink may refer to a direct link between UEs 120, and an access link may refer to a direct link between a base station 110 and a UE 120. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In NR, access link communications between the base station 110 and a UE 120 may utilize beamforming (e.g., for millimeter wave communications) and/or multiple input multiple output (MIMO) (e.g., for multi-layer communications) to improve performance. To support beamforming and/or MIMO, a UE 120 may measure channel state information reference signals (CSI-RSs) received from the base station 110, and may provide a detailed channel state information (CSI) report to the base station 110 based at least in part on the measurements. The detailed CSI report may include, for example, a channel quality indicator (CQI) parameter, a precoding matrix indicator (PMI) parameter for beam management, a CSI-RS resource indicator (CRI) parameter, a strongest later indication (SLI) parameter for MIMO, a rank indication (RI) parameter for MIMO, a layer 1 (L1) reference signal received power (RSRP) (L1-RSRP) parameter for beam management, and/or the like.

To improve performance of sidelink communications, beamforming and/or MIMO may need to be supported. However, there is currently no mechanism to support a detailed CSI report for sidelink communications. For example, CSI reporting in the sidelink channel may be limited to reporting only a CQI parameter, which is insufficient for good beamforming and/or MIMO performance. Furthermore, different sidelink use cases or scenarios (e.g., P2P, D2D, V2X, a mesh network, and/or the like) may require reporting of different combinations of parameters in a CSI report depending on, for example, a latency requirement, a reliability requirement, whether beamforming is supported, whether MIMO is supported, an accuracy or performance requirement for beamforming and/or MIMO, a quantity of available resources for CSI reporting, and/or the like. Still further, in access link communications, there may be dedicated resources for CSI-RSs and/or for CSI reporting, whereas such resources may be more difficult to reserve in a decentralized network that uses sidelink communications.

Some techniques and apparatuses described herein permit a UE 120 to use a medium access control (MAC) control element (CE) (collectively, MAC-CE) to transmit or receive a detailed CSI report for a sidelink channel, thereby permitting improved performance for beamforming and/or MIMO. Using a MAC-CE (e.g., in a PSSCH transmission) may eliminate the need for dedicated resources for CSI reporting, because the CSI report can be multiplexed with other PSSCH communications. Transmission of a CSI report in the MAC-CE may be flexibly configured for different scenarios according to a MAC-CE configuration. This may provide a tradeoff between performance improvements achievable via the CSI report versus overhead and latency due to transmission of the CSI report. Furthermore, the MAC-CE may be configured to carry information other than a CSI report in the sidelink channel (e.g., a power headroom report, a buffer status report, a transmission configuration indication (TCI) state, and/or the like), thereby conserving network resources that would otherwise be used for separate transmission of the CSI report and/or the other information.

As indicated above, FIG. 4 is provided as an example. Other examples may differ from what is described with respect to FIG. 4.

Figure 5:
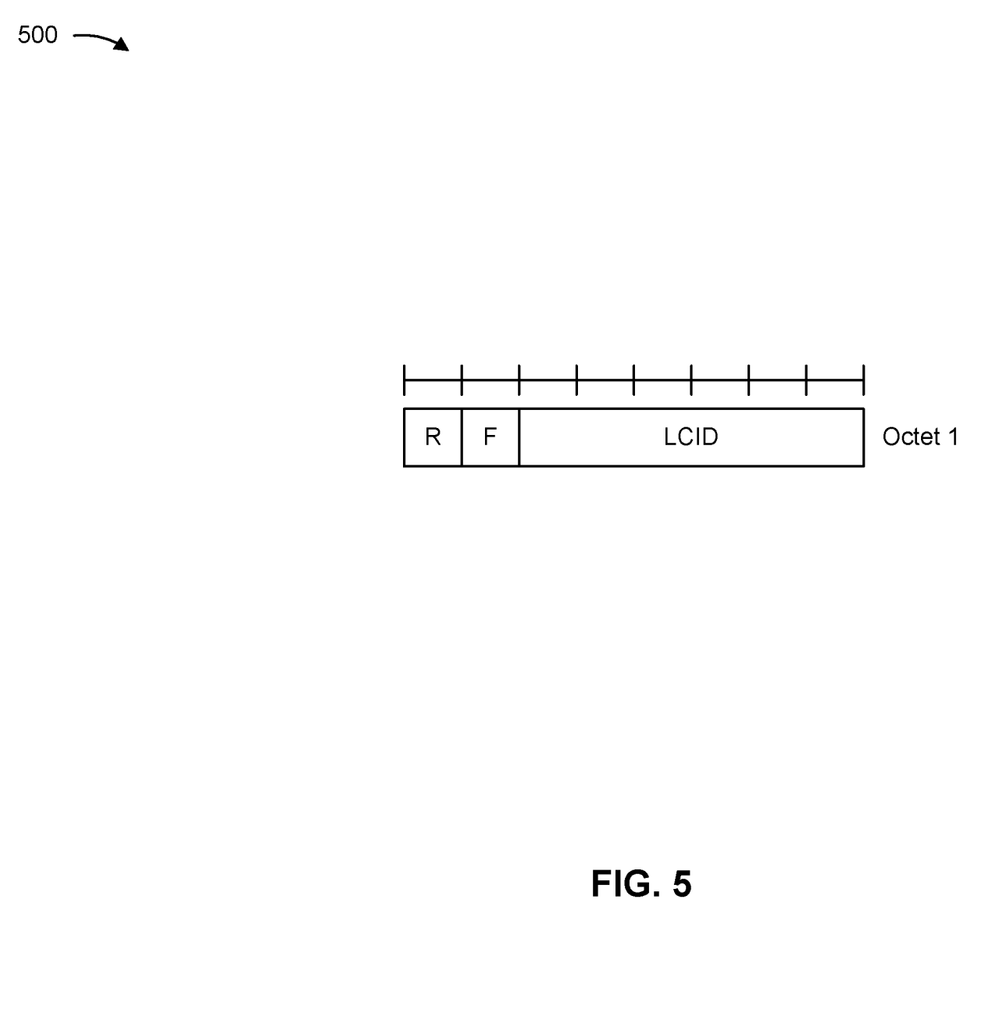
FIG. 5 is a diagram illustrating an example of a medium access control (MAC) control element (CE) (MAC-CE), in accordance with various aspects of the present disclosure.

FIG. 5 is a diagram illustrating an example 500 of a MAC-CE, in accordance with various aspects of the present disclosure.

A MAC-CE may refer to a communication structure, in a MAC layer communication, that carries control information. A MAC-CE may be implemented using a bit string in a logical channel identifier (LCID) field of a MAC header. FIG. 5 shows a first octet (Octet 1) of a MAC header, which includes a reserved (R) field, a format (F) field, and an LCID field. In FIG. 5, the R field is shown as having a length of 1 bit, the F field is shown as having a length of 1 bit, and the LCID field is shown as having a length of 6 bits. In some aspects, a first set of LCID values (e.g., bit strings) may indicate an identity of a logical channel, and a second set of LCID values may indicate a set of MAC-CEs. In some aspects, a correspondence between an LCID value and an interpretation of that LCID value (e.g., as indicating a logical channel, as a MAC-CE, and/or the like) may be prespecified and/or configured (e.g., using a table of LCID values).

As indicated above, FIG. 5 is provided as an example. Other examples may differ from what is described with respect to FIG. 5.

Figure 6:
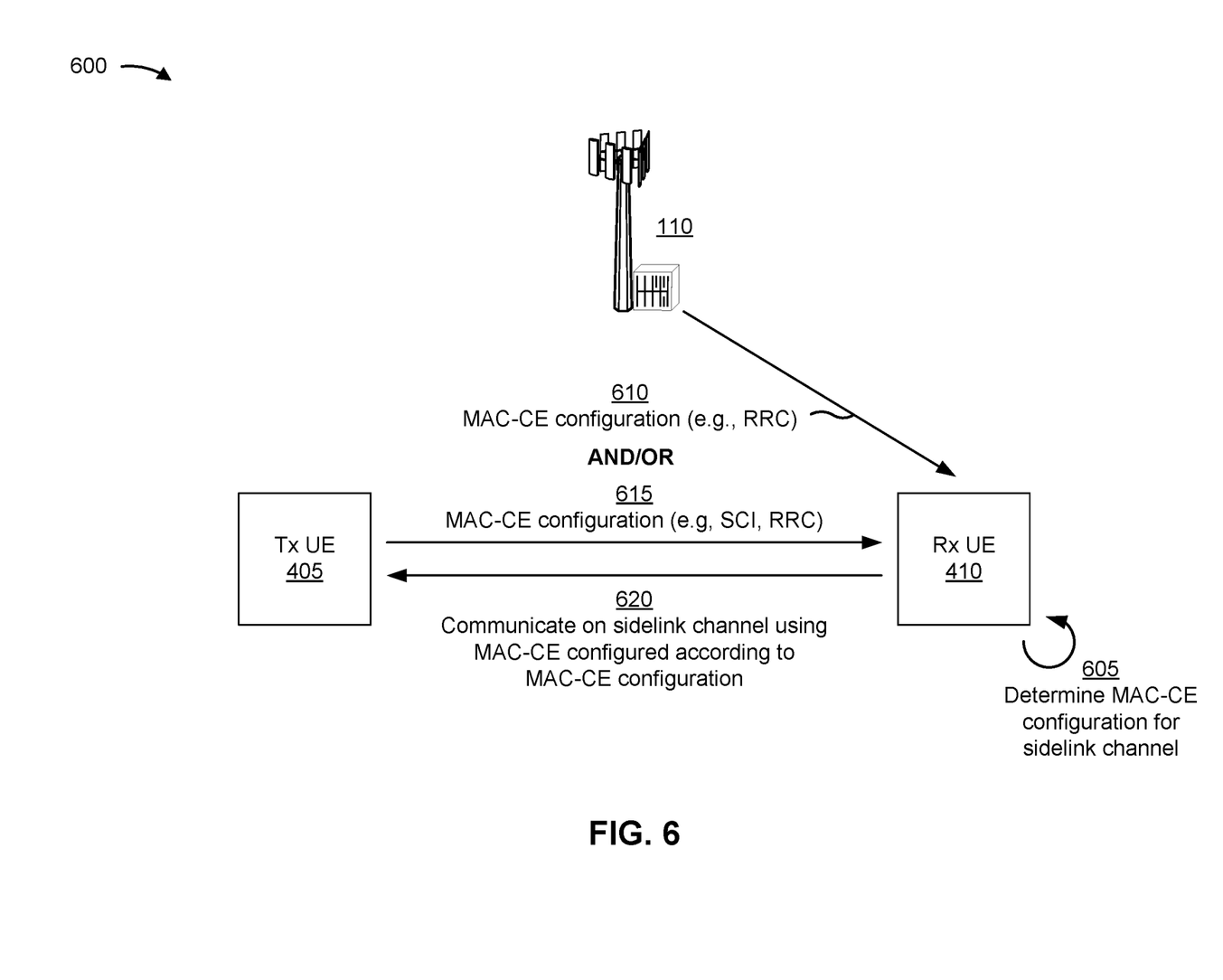
FIGS. 6 and 7 are diagrams illustrating examples of communicating on a sidelink channel using a MAC-CE, in accordance with various aspects of the present disclosure.

FIG. 6 is a diagram illustrating an example 600 of communicating on a sidelink channel using a MAC-CE, in accordance with various aspects of the present disclosure. As shown in FIG. 6, a Tx UE 405 and an Rx UE 410 may communicate with one another via one or more sidelink channels. As further shown, a base station 110 and the Rx UE 410 may communicate with one another via one or more access links. Additionally, or alternatively, the base station 110 and the Tx UE 405 may communicate with one another via one or more access links. In some aspects, the Tx UE 405 and the Rx UE 410 may communicate with one another without assistance from a base station 110 (e.g., without communicating with a base station 110).

As shown by reference number 605, the Rx UE 410 may determine a MAC-CE configuration for a sidelink channel. Although some operations are described herein in connection with the Rx UE 410 determining a MAC-CE configuration and/or communicating based at least in part on the MAC-CE configuration (e.g., transmitting or receiving a MAC-CE according to the MAC-CE configuration), the Tx UE 405 may perform such operations in a similar manner. The Rx UE 410 may determine the MAC-CE configuration autonomously (e.g., based at least in part on a capability of the Rx UE 410, channel characteristics, and/or the like), may determine the MAC-CE configuration based at least in part on information received from the base station 110, may determine the MAC-CE configuration based at least in part on information received from the Tx UE 405, and/or the like.

For example, as shown by reference number 610, in some aspects, the Rx UE 410 may receive a MAC-CE configuration (and/or one or more parameters used to determine the MAC-CE configuration) from the base station 110. For example, the base station 110 may transmit the MAC-CE configuration to the Rx UE 410 in a radio resource control (RRC) message (e.g., an RRC configuration message, an RRC reconfiguration message, and/or the like), such as an access link RRC message, a downlink RRC message, a unicast RRC message, and/or the like.

As described in more detail below in connection with FIG. 7, the MAC-CE configuration may indicate whether a transport block includes a MAC-CE, may indicate a number of MAC-CEs included in a transport block, may indicate a size of one or more MAC-CEs, may indicate a location of one or more MAC-CEs within a transport block, may indicate a number of valid bit combinations for the one or more MAC-CEs, may indicate the valid bit combinations for the one or more MAC-CEs, and/or the like. The MAC-CE configuration may be for a specific MAC-CE within a specific transport block, a specific MAC-CE of multiple MAC-CEs included in a specific transport block, all MAC-CEs included in a specific transport block, a MAC-CE in a specific location or set of locations in multiple transport blocks (e.g., all transport blocks), all MAC-CEs across multiple transport blocks (e.g., all transport blocks), and/or the like.

Additionally, or alternatively, as shown by reference number 615, the Rx UE 410 may receive a MAC-CE configuration (and/or one or more parameters used to determine the MAC-CE configuration) from the Tx UE 405. For example, the Tx UE 405 may transmit the MAC-CE configuration to the Rx UE 410 in an RRC message, such as a sidelink RRC message. Additionally, or alternatively, the Tx UE 405 may transmit the MAC-CE configuration to the Rx UE 410 in SCI. Additionally, or alternatively, the Tx UE 405 may transmit the MAC-CE configuration to the Rx UE 410 in a sidelink broadcast channel (SBCH), such as a physical SBCH (PSBCH). As indicated above, details of the MAC-CE configuration are described below in connection with FIG. 7.

As shown by reference number 620, the Rx UE 410 may communicate on the sidelink channel (e.g., with the Tx UE 405) using a MAC-CE configured according to the MAC-CE configuration. In some aspects, such communications may include receiving a MAC-CE (e.g., from the Tx UE 405) configured according to the MAC-CE configuration so that the Rx UE 410 can properly interpret the MAC-CE and/or the transport bock that includes the MAC-CE. Additionally, or alternatively, such communications may include transmitting a MAC-CE (e.g., to the Tx UE 405) configured according to the MAC-CE configuration so that the Tx UE 405 can properly interpret the MAC-CE and/or the transport bock that includes the MAC-CE. In this way, communication errors may be reduced.

In some aspects, the Tx UE 405 and/or the base station 110 may indicate the MAC-CE configuration using an index value. For example, the Tx UE 405 may indicate the MAC-CE configuration using an index value transmitted in SCI (e.g., in a PSCCH). The index value may map to an entry (e.g., a row) in a table of MAC-CE configurations. The table may be prespecified (e.g., according to a wireless communication standard), may be configured in an RRC message (e.g., transmitted by the base station 110 and/or the Tx UE 405), may be indicated in SCI, may be indicated in an SBCH, and/or the like. The table may indicate a set of index values and a corresponding set of MAC-CE configuration parameters (e.g., described above and also described in more detail below in connection with FIG. 7). Thus, the table of MAC-CE configurations may be fixed or semi-statically configured (e.g., in a downlink RRC message, a sidelink RRC message, an SBCH, and/or the like), and a MAC-CE configuration may be selected from the table and indicated to the Rx UE 410 using an index value that corresponds to the MAC-CE configuration (e.g., in SCI), thereby reducing overhead and conserving network resources.

In some aspects, the MAC-CE includes CSI feedback, such as a CSI report. In some aspects, the CSI report may be a detailed CSI report that includes more parameters than a CQI parameter. For example, the detailed CSI report may include the CQI parameter, a PMI parameter (e.g., for beam management), a CRI parameter, an SLI parameter (e.g., for MIMO), an RI parameter (e.g., for MIMO), an L1-RSRP parameter (e.g., for beam management), and/or the like. As a result, the Tx UE 405 and the Rx UE 410 may communicate using beamforming and/or MIMO with improved performance due to the detailed CSI report. Furthermore, network resources may be conserved by included the CSI report in the MAC-CE.

As indicated above, FIG. 6 is provided as an example. Other examples may differ from what is described with respect to FIG. 6.

Figure 7:
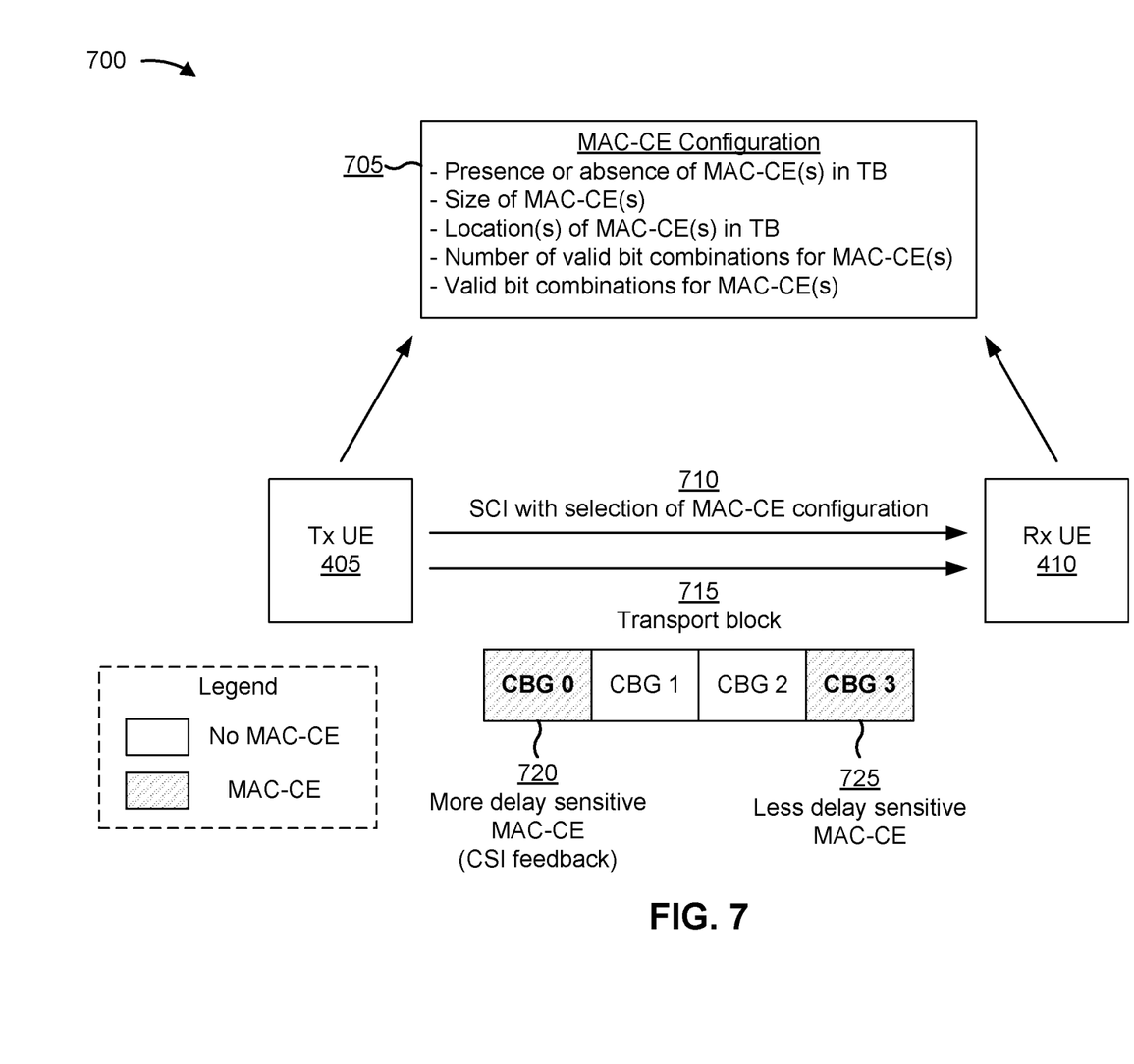

FIG. 7 is a diagram illustrating an example 700 of communicating on a sidelink channel using a MAC-CE, in accordance with various aspects of the present disclosure. As shown in FIG. 7, a Tx UE 405 and an Rx UE 410 may communicate with one another via one or more sidelink channels.

As shown by reference number 705, the Tx UE 405 and/or the Rx UE 410 may determine a MAC-CE configuration for a sidelink channel used to communicate with one another. Details of determining the MAC-CE configuration are described above in connection with FIG. 6.

As shown, the MAC-CE configuration may include one or more MAC-CE configuration parameters. In some aspects, a MAC-CE configuration parameter may indicate whether a TB includes a MAC-CE. For example, the Tx UE 405 may transmit SCI that schedules a TB, as described above in connection with FIG. 3. In some aspects, the SCI may include a MAC-CE configuration parameter that indicates whether the TB includes a MAC-CE. Additionally, or alternatively, the SCI may indicate whether the TB includes a particular type of MAC-CE, such as a MAC-CE that includes CSI feedback.

Additionally, or alternatively, a MAC-CE configuration parameter may indicate a number of MAC-CEs included in a TB. In some aspects, a single MAC-CE may be included in a TB. In some aspects, multiple MAC-CEs (e.g., two MAC-CEs) may be included in a TB. For example, the TB may include a first MAC-CE in a first location of the TB (e.g., a beginning of the TB, a first codeblock group (CBG) of the TB, and/or the like) and a second MAC-CE in a second location of the TB (e.g., an end of the TB, a second CBG of the TB, and/or the like).

Additionally, or alternatively, a MAC-CE configuration parameter may indicate a location of one or more MAC-CEs within a TB. In some aspects, a TB may include multiple codeblock groups (CBGs). The location may indicate, for example, a beginning of the TB (e.g., a set of initial bits of the TB), an end of the TB (e.g., a set of final bits of the TB), a specific CBG of the TB (e.g., an initial CBG of the TB, a final CBG of the TB, a CBG identified using a CBG identifier, and/or the like), a location within a CBG (e.g., a beginning of the CBG, an end of the CBG, and/or the like), and/or the like. If the TB includes a single MAC-CE, then the MAC-CE configuration may indicate a location of the single MAC-CE. If the TB includes multiple MAC-CEs, then the MAC-CE configuration may indicate a location for each of the multiple MAC-CEs.

Additionally, or alternatively, a MAC-CE configuration parameter may indicate a size of one or more MAC-CEs. The size for a MAC-CE may indicate a number of bits included in the MAC-CE. If a TB includes a single MAC-CE, then the MAC-CE configuration may indicate a size of the single MAC-CE. If the TB includes multiple MAC-CEs, then the MAC-CE configuration may indicate a size of each of the multiple MAC-CEs. In some aspects, the MAC-CE configuration may indicate that all of the MAC-CEs included in a TB are the same size. Additionally, or alternatively, the UE interpreting the MAC-CE configuration may interpret an indicated size as applying to all MAC-CEs in a TB. In some aspects, the MAC-CE configuration may indicate different sizes for different MAC-CEs in a TB.

Additionally, or alternatively, a MAC-CE configuration parameter may indicate a number of valid bit combinations for one or more MAC-CEs. As described above in connection with FIG. 5, some LCID values (e.g., bit strings or bit combinations) may indicate logical channel identities, some LCID values may indicate MAC-CEs, and some LCID values may indicate other information. In some aspects, the MAC-CE configuration may indicate a number of LCID values that correspond to MAC-CEs. Additionally, or alternatively, a MAC-CE configuration parameter may indicate the valid bit combinations for the one or more MAC-CEs. For example, the MAC-CE configuration may indicate a number of LCID values that correspond to valid MAC-CEs (e.g., three) and may indicate the bit strings for those LCID values (e.g., 111011, 111100, 111101). In some aspects, multiple MAC-CEs (e.g., all MAC-CEs) included in a TB may have the same valid bit combinations and/or the same number of valid bit combinations. Alternatively, different MAC-CEs included in a TB may have different valid bit combinations and/or different numbers (e.g., quantities) of valid bit combinations.

As described above, in some aspects, an SCI may schedule multiple TBs. In this case, the MAC-CE configuration may be TB-specific (e.g., for a specific TB scheduled by the SCI), may be TB group-specific (e.g., for a group of TBs scheduled by the SCI), or may apply to all TBs scheduled by the SCI. Although the SCI is described in some examples of FIG. 7 as indicating the MAC-CE configuration, the MAC-CE configuration may also or alternatively be indicated by an RRC message (e.g., a downlink RRC message, a sidelink RRC message, and/or the like), by an SBCH message, and/or the like, as described elsewhere herein.

As shown by reference number 710, in some aspects, the Tx UE 405 may use SCI to indicate a MAC-CE configuration, such as by using an index value to identify the MAC-CE configuration from a set (e.g., a table) of MAC-CE configurations, as described elsewhere herein. The Rx UE 410 may receive the indication of the MAC-CE configuration, and may locate one or more MAC-CEs, interpret one or more MAC-CEs, and/or interpret one or more TBs that include the one or more MAC-CEs based at least in part on the MAC-CE configuration.

As shown by reference number 715, the Tx UE 405 may transmit a TB to the Rx UE 410. As shown, based at least in part on the MAC-CE configuration, the TB includes a first MAC-CE in an initial CBG (shown as CBG 0) and a second MAC-CE in a final CBG (shown as CBG 3). In some cases, this may be referred to as a two-part MAC-CE, with a first part of a MAC-CE (or a first MAC-CE) in a first location of the TB and a second part of the MAC-CE (or a second MAC-CE) in a second location of the TB.

In some aspects, the first location may occur earlier in time than the second location. For example, the first location may be a beginning of the TB (e.g., an initial set of bits of the TB, an initial CBG of the TB, and/or the like), and the second location may be an end of the TB (e.g., a final set of bits of the TB, a final CBG of the TB, and/or the like). In this case, the first MAC-CE or the first part of the MAC-CE may carry a first set of CEs (e.g., one or more first CEs) that are more delay-sensitive than a second set of CEs (e.g., one or more second CEs) that are carried in the second MAC-CE or the second part of the MAC-CE.

For example, as shown by reference number 720, the earlier-occurring MAC-CE may carry more delay-sensitive (and/or higher priority) CEs. Similarly, as shown by reference number 725, the later-occurring MAC-CE may carry less delay-sensitive (and/or lower priority) CEs. In some aspects, a more delay-sensitive CE may include CSI feedback, as shown. Additionally, or alternatively, a more delay-sensitive CE may include a TCI state indication (e.g., for control, for data, and/or the like), a TCI state activation command (e.g., for control, for data, and/or the like), a CSI command, a CSI report, and/or the like. In some aspects, a less delay-sensitive CE may include a power headroom report (PHR), a buffer status report (BSR), and/or the like.

In some aspects, the Tx UE 405 and/or the Rx UE 410 may use CBG-based ACK/NACK (e.g., rather than TB-based ACK/NACK). In this case, a UE that receives CSI feedback in a CBG may be able to transmit ACK/NACK feedback for the CBG with the CSI feedback earlier in time as compared to transmitting ACK/NACK feedback after receiving the entire TB. This may permit faster reaction and adjustment to changing channel conditions.

By using a MAC-CE to carry control information in a sidelink channel, the Tx UE 405 and the Rx UE 410 may conserve network resources that would otherwise be used for separate transmission of the control information. In some aspects, the MAC-CE may include CSI feedback for the sidelink channel, thereby permitting improved performance for beamforming and/or MIMO. Using a MAC-CE may eliminate the need for dedicated resources for CSI reporting because the CSI report can be multiplexed with other sidelink communications. Furthermore, transmission of a CSI report in the MAC-CE may be flexibly configured for different scenarios according to a MAC-CE configuration.

As indicated above, FIG. 7 is provided as an example. Other examples may differ from what is described with respect to FIG. 7.

Figure 8:
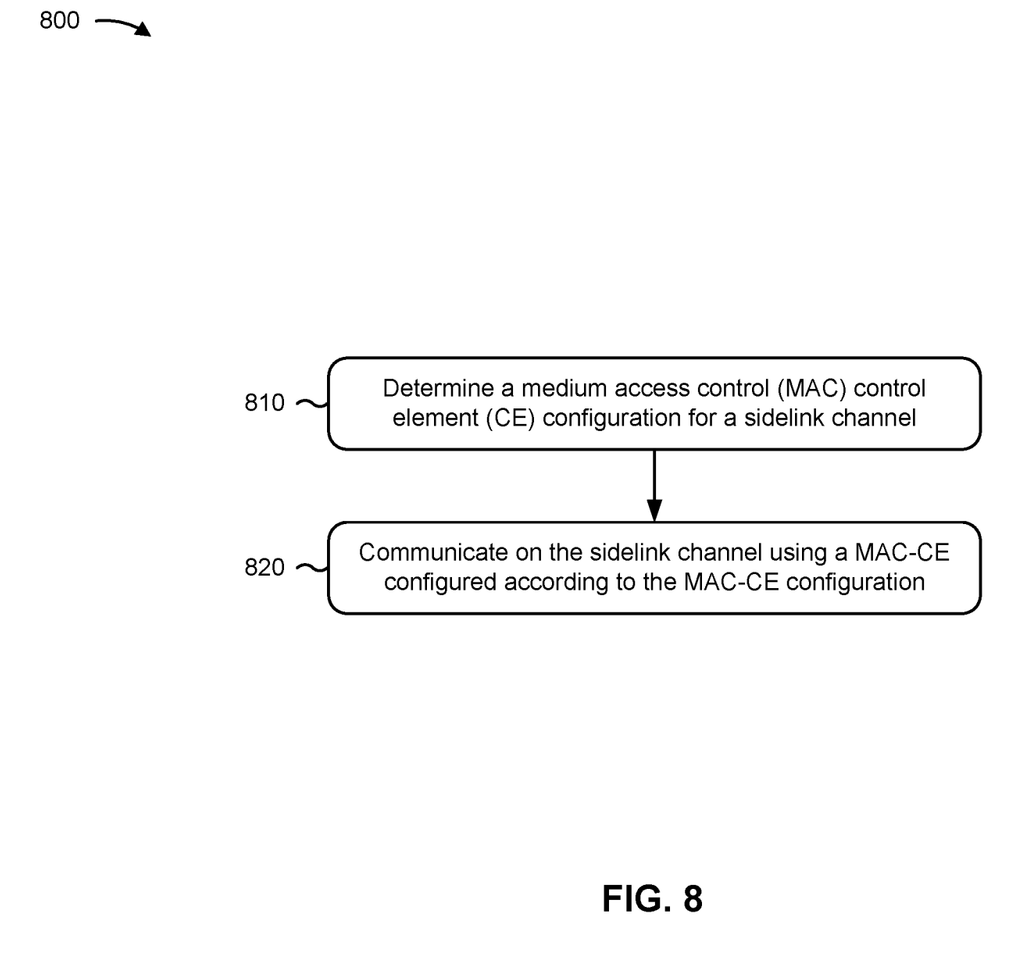
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120 and/or the like) performs operations associated with communicating on a sidelink channel using a MAC-CE.

As shown in FIG. 8, in some aspects, process 800 may include determining a MAC-CE configuration for a sidelink channel (block 810). For example, the UE (e.g., using receive processor 258, transmit processor 264, controller/processor 280, memory 282, and/or the like) may determine a MAC-CE configuration for a sidelink channel, as described above.

As further shown in FIG. 8, in some aspects, process 800 may include communicating on the sidelink channel using a MAC-CE configured according to the MAC-CE configuration (block 820). For example, the UE (e.g., using receive processor 258, transmit processor 264, controller/processor 280, memory 282, and/or the like) may communicate on the sidelink channel using a MAC-CE configured according to the MAC-CE configuration, as described above.

Process 800 may include additional aspects, such as any single aspect or any combination of aspects described below and/or in connection with one or more other processes described elsewhere herein.

In a first aspect, communicating on the sidelink channel using the MAC-CE comprises transmitting or receiving channel state information feedback in the MAC-CE.

In a second aspect, alone or in combination with the first aspect, communicating on the sidelink channel using the MAC-CE comprises: receiving channel state information feedback in a codeblock group that includes the MAC-CE; and transmitting acknowledgement or negative acknowledgement feedback based at least in part on receiving the codeblock group that includes the MAC-CE.

In a third aspect, alone or in combination with one or more of the first and second aspects, the MAC-CE configuration indicates at least one of whether a transport block includes the MAC-CE, a number of MAC-CEs included in a transport block, a size of the MAC-CE, a location of the MAC-CE within a transport block, a number of valid bit combinations for the MAC-CE, the valid bit combinations for the MAC-CE, or a combination thereof.

In a fourth aspect, alone or in combination with one or more of the first through third aspects, the location of the MAC-CE within the transport block indicates at least one of: a location at a beginning of the transport block, a location at an end of the transport block, a location within an initial codeblock group of the transport block, or a location within a specific codeblock group of the transport block.

In a fifth aspect, alone or in combination with one or more of the first through fourth aspects, the MAC-CE configuration indicates a two-part MAC-CE, and a first part of the MAC-CE is located in a first location of a transport block and a second part of the MAC-CE is located in a second location of the transport block.

In a sixth aspect, alone or in combination with one or more of the first through fifth aspects, the first location is a beginning of the transport block and the second location is an end of the transport block.

In a seventh aspect, alone or in combination with one or more of the first through sixth aspects, one or more first CEs are carried in the first part of the MAC-CE and one or more second CEs are carried in the second part of the MAC-CE, and the first location occurs earlier in time than the second location.

In an eighth aspect, alone or in combination with one or more of the first through seventh aspects, the one or more first CEs include channel state information feedback.

In a ninth aspect, alone or in combination with one or more of the first through eighth aspects, the MAC-CE configuration is received in at least one of a downlink radio resource control message from a base station, a sidelink radio resource control message from another UE, sidelink control information, a sidelink broadcast channel, or a combination thereof.

In a tenth aspect, alone or in combination with one or more of the first through ninth aspects, the MAC-CE configuration is indicated using an index value that maps to an entry in a table of MAC-CE configurations.

In an eleventh aspect, alone or in combination with one or more of the first through tenth aspects, the index value is indicated in sidelink control information.

In a twelfth aspect, alone or in combination with one or more of the first through eleventh aspects, the table is indicated in at least one of a downlink radio resource control message from a base station, a sidelink radio resource control message from another UE, a sidelink broadcast channel, or a combination thereof.

In a thirteenth aspect, alone or in combination with one or more of the first through twelfth aspects, a set of tables of MAC-CE configurations is indicated in at least one of a downlink radio resource control message from a base station, a sidelink radio resource control message from another UE, a sidelink broadcast channel, or a combination thereof; and the table is selected from the set of tables based at least in part on an indication in sidelink control information.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining a medium access control (MAC) control element (CE) (MAC-CE) configuration for a sidelink channel,
      wherein the MAC-CE configuration is indicated using an index value that maps to an entry in a table of MAC-CE configurations,
      wherein the table is indicated in at least one of a downlink radio resource control message, a sidelink radio resource control message, or a sidelink broadcast channel,
      wherein a set of tables of MAC-CE configurations is indicated in the at least one of the downlink radio resource control message, the sidelink radio resource control message, or the sidelink broadcast channel, and
      wherein the table is selected from the set of tables based at least in part on an indication in sidelink control information; and
   communicating on the sidelink channel using a MAC-CE configured according to the MAC-CE configuration.

2. The method of claim 1, wherein communicating on the sidelink channel using the MAC-CE comprises transmitting or receiving channel state information feedback in the MAC-CE.

3. The method of claim 1, wherein communicating on the sidelink channel using the MAC-CE comprises:
   receiving channel state information feedback in a codeblock group that includes the MAC-CE; and
   transmitting acknowledgement or negative acknowledgement feedback based at least in part on receiving the codeblock group that includes the MAC-CE.

4. The method of claim 1, wherein the MAC-CE configuration indicates at least one of whether a transport block includes the MAC-CE, a quantity of MAC-CEs included in the transport block, a size of the MAC-CE, a location of the MAC-CE within the transport block, a quantity of valid bit combinations for the MAC-CE, or the valid bit combinations for the MAC-CE.

5. The method of claim 4, wherein the location of the MAC-CE within the transport block indicates at least one of:
   a location at a beginning of the transport block,
   a location at an end of the transport block,
   a location within an initial codeblock group of the transport block, or
   a location within a specific codeblock group of the transport block.

6. The method of claim 1, wherein the MAC-CE configuration indicates a two-part MAC-CE, wherein a first part of the MAC-CE is located in a first location of a transport block and a second part of the MAC-CE is located in a second location of the transport block.

7. The method of claim 6, wherein the first location is a beginning of the transport block and the second location is an end of the transport block.

8. The method of claim 6, wherein one or more first CEs are carried in the first part of the MAC-CE and one or more second CEs are carried in the second part of the MAC-CE, and wherein the first location occurs earlier in time than the second location.

9. The method of claim 8, wherein the one or more first CEs include channel state information feedback.

10. The method of claim 1, wherein the MAC-CE configuration is received in the at least one of a downlink radio resource control message, the sidelink radio resource control message, the sidelink control information, or the sidelink broadcast channel.

11. The method of claim 1, wherein the index value is indicated in sidelink control information.

12. A user equipment (UE) for wireless communication, comprising:
   a memory; and
   one or more processors coupled to the memory, the one or more processors configured to cause the UE to:
      determine a medium access control (MAC) control element (CE) (MAC-CE) configuration for a sidelink channel,
         the MAC-CE configuration being indicated using an index value that maps to an entry in a table of MAC-CE configurations,
         the table being indicated in at least one of a downlink radio resource control message, a sidelink radio resource control message, or a sidelink broadcast channel,
         a set of tables of MAC-CE configurations being indicated in the at least one of the downlink radio resource control message, the sidelink radio resource control message, or the sidelink broadcast channel, and
         the table being selected from the set of tables based at least in part on an indication in sidelink control information; and
      communicate on the sidelink channel using a MAC-CE configured according to the MAC-CE configuration.

13. The UE of claim 12, wherein the one or more processors, when communicating on the sidelink channel using the MAC-CE, are configured to cause the UE to transmit or receive channel state information feedback in the MAC-CE.

14. The UE of claim 12, wherein the one or more processors, when communicating on the sidelink channel using the MAC-CE, are configured to cause the UE to:

receive channel state information feedback in a codeblock group that includes the MAC-CE; and transmit acknowledgement or negative acknowledgement feedback based at least in part on receiving the codeblock group that includes the MAC-CE.

15. The UE of claim 12, wherein the MAC-CE configuration indicates at least one of whether a transport block includes the MAC-CE, a quantity of MAC-CEs included in the transport block, a size of the MAC-CE, a location of the MAC-CE within the transport block, a quantity of valid bit combinations for the MAC-CE, or the valid bit combinations for the MAC-CE.

16. The UE of claim 15, wherein the location of the MAC-CE within the transport block indicates at least one of:
   a location at a beginning of the transport block,
   a location at an end of the transport block,
   a location within an initial codeblock group of the transport block, or
   a location within a specific codeblock group of the transport block.

17. The UE of claim 12, wherein the MAC-CE configuration indicates a two-part MAC-CE, wherein a first part of the MAC-CE is located in a first location of a transport block and a second part of the MAC-CE is located in a second location of the transport block.

18. The UE of claim 17, wherein the first location is a beginning of the transport block and the second location is an end of the transport block.

19. The UE of claim 17, wherein one or more first CEs are carried in the first part of the MAC-CE and one or more second CEs are carried in the second part of the MAC-CE, and wherein the first location occurs earlier in time than the second location.

20. The UE of claim 19, wherein the one or more first CEs include channel state information feedback.

21. The UE of claim 12, wherein the one or more processors configured to cause the UE to receive the MAC-CE configuration in the at least one of a downlink radio resource control message, the sidelink radio resource control message, the sidelink control information, or the sidelink broadcast channel.

22. The UE of claim 12, wherein the index value is indicated in sidelink control information.

23. A non-transitory computer-readable medium storing a set of instructions for wireless communication, the set of instructions comprising:
   one or more instructions that, when executed by one or more processors of a user equipment (UE), cause the UE to:
      determine a medium access control (MAC) control element (CE) (MAC-CE) configuration for a sidelink channel,
         wherein the MAC-CE configuration is indicated using an index value that maps to an entry in a table of MAC-CE configurations,
         wherein the table is indicated in at least one of a downlink radio resource control message, a sidelink radio resource control message, or a sidelink broadcast channel,
         wherein a set of tables of MAC-CE configurations is indicated in the at least one of the downlink radio resource control message, the sidelink radio resource control message, or the sidelink broadcast channel, and
         wherein the table is selected from the set of tables based at least in part on an indication in sidelink control information; and
      communicate on the sidelink channel using a MAC-CE configured according to the MAC-CE configuration.

24. The non-transitory computer-readable medium of claim 23, wherein the one or more instructions, that cause the UE to communicate on the sidelink channel using the MAC-CE, cause the UE to:
   transmit or receive channel state information feedback in the MAC-CE.

25. The non-transitory computer-readable medium of claim 23, wherein the one or more instructions, that cause the UE to communicate on the sidelink channel using the MAC-CE, cause the UE to:
   receive channel state information feedback in a codeblock group that includes the MAC-CE; and
   transmit acknowledgement or negative acknowledgement feedback based at least in part on receiving the codeblock group that includes the MAC-CE.

26. The non-transitory computer-readable medium of claim 23, wherein the MAC-CE configuration indicates at least one of whether a transport block includes the MAC-CE, a quantity of MAC-CEs included in the transport block, a size of the MAC-CE, a location of the MAC-CE within the transport block, a quantity of valid bit combinations for the MAC-CE, or the valid bit combinations for the MAC-CE.

27. The non-transitory computer-readable medium of claim 26, wherein the location of the MAC-CE within the transport block indicates at least one of:
   a location at a beginning of the transport block,
   a location at an end of the transport block,
   a location within an initial codeblock group of the transport block, or
   a location within a specific codeblock group of the transport block.

28. An apparatus for wireless communication, comprising:
   means for determining a medium access control (MAC) control element (CE) (MAC-CE) configuration for a sidelink channel,
      the MAC-CE configuration being is-indicated using an index value that maps to an entry in a table of MAC-CE configurations,
      the table being vindicated in at least one of a downlink radio resource control message, a sidelink radio resource control message, or a sidelink broadcast channel,
      a set of tables of MAC-CE configurations being indicated in the at least one of the downlink radio resource control message, the sidelink radio resource control message, or the sidelink broadcast channel, and
      the table being selected from the set of tables based at least in part on an indication in sidelink control information; and
   means for communicating on the sidelink channel using a MAC-CE configured according to the MAC-CE configuration.

* * * * *